United States Patent [19]

Lask et al.

[11] Patent Number: 4,820,341
[45] Date of Patent: Apr. 11, 1989

[54] PROCESS FOR PRODUCING SILICON OR FERROSILICON IN A LOW-SHAFT ELECTRIC FURNACE

[75] Inventors: Gert-Wilhelm Lask, Berus, Fed. Rep. of Germany; Robert Nooden, Terre Haute, Ind.

[73] Assignee: International Minerals & Chemical Corporation, Northbrook, Ill.

[21] Appl. No.: 865,164

[22] Filed: May 20, 1986

[30] Foreign Application Priority Data

May 21, 1985 [DE] Fed. Rep. of Germany ....... 3518151
Nov. 21, 1985 [DE] Fed. Rep. of Germany ....... 3541125

[51] Int. Cl.$^4$ .................... C01B 33/02; C22C 38/02
[52] U.S. Cl. .................... 75/10.61; 420/578; 423/350
[58] Field of Search ............... 423/348–350, 423/344; 75/10.61, 10.60; 420/578

[56] References Cited

U.S. PATENT DOCUMENTS

| 602,976 | 4/1898 | Chalmot | 75/10.6 |
| 1,171,719 | 2/1916 | Harrison | 75/10.6 |
| 3,704,094 | 11/1972 | McClincy | 423/350 |
| 4,364,974 | 12/1982 | Lask | 423/345 |
| 4,366,137 | 12/1982 | Lask | 423/350 |
| 4,389,493 | 6/1983 | Lask | 423/349 |

FOREIGN PATENT DOCUMENTS

| 901114 | 3/1985 | Belgium . | |
| 1915905 | 7/1974 | Fed. Rep. of Germany . | |
| 3032720 | 12/1982 | Fed. Rep. of Germany . | |
| 2008559 | 6/1979 | United Kingdom | 423/350 |
| 2084122 | 4/1982 | United Kingdom . | |
| 2150128 | 6/1985 | United Kingdom | 423/349 |

Primary Examiner—John Doll
Assistant Examiner—Jeffrey E. Russel
Attorney, Agent, or Firm—Herbert Dubno; Ronald Lianides

[57] ABSTRACT

A process for the production of silicon in a low-shaft electric furnace, in which raw-material blanks are first formed which contain fine-grain silicon dioxide, e.g. in the form of sand, and carbon in excess in respect of the reduction to silicon carbide and the raw-material blanks are introduced into the low-shaft furnace as a charge in mixture with silicon dioxide in lump form. The silicon dioxide in the raw-material moldings is reduced to silicon carbide in an upper part of the low-shaft electric furnace at a temperature of below 1600° C. and coke structure agglomerates are formed from the excess carbon of the raw-material moldings. In a lower part of the low-shaft electric furnace, the silicon dioxide in lump form, is reduced to silicon with silicon carbide and carbon from the coke structure agglomerates at a temperature of above 1600° C., preferably from 1800° to 200° C. The raw-material moldings are formed with bituminous binder containing a fine-particle silica powder. The silicon carbon reduction results in coke structure agglomerates having a very large internal carbon area in accordance with the internal area and percentage proportion of silica powder in the raw-material moldings. The silicon dioxide and gaseous silicon monoxide are reduced with the coke structure agglomerates having the increased internal area.

12 Claims, 1 Drawing Sheet

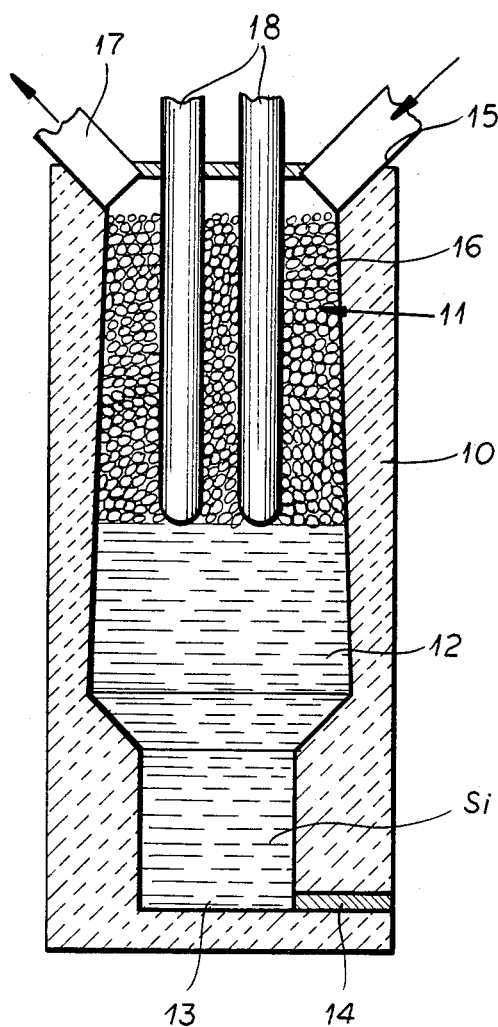

PROCESS FOR PRODUCING SILICON OR FERROSILICON IN A LOW-SHAFT ELECTRIC FURNACE

CROSS REFERENCE TO RELATED APPLICATION

This application is related to the copending application Ser. No. 674,760 filed Nov. 26, 1984, which refers, in turn, to U.S. Pat. No. 4,366,137, U.S. Pat. No. 4,364,974 and U.S. Pat. No. 4,389,493.

FIELD OF THE INVENTION

Our present invention relates to a process for the production of silicon or ferrosilicon in a low-shaft electric furnace.

BACKGROUND OF THE INVENTION

From the earlier application mentioned above, and the references cited therein, it is known to produce silicon or ferrosilicon by a method in which raw-material blanks are first formed, which contain fine-grain silicon-dioxide and carbon in excess in respect of the reduction to silicon carbide and the raw-material blanks are introduced into a low-shaft electric furnace as a charge in mixture with silicon dioxide in lump form.

The silicon dioxide in the raw-material moldings (usually briquettes) is reduced to silicon carbide in an upper part of the electric low-shaft furnace at a temperature of below 1600° C. and coke structure agglomerates are formed from the raw-material molding carbon unused during this reduction.

The molten silicon dioxide added in lump form with the charge is reduced, with the silicon carbide and carbon from the coke structure agglomerates, to silicon in a bottom part of the electric low shaft furnace at a temperature of above 1600°, preferably from 1800° to 2000° C.

"Silicon dioxide" as this term is used herein denotes all conventional silicon carriers, more particularly, quartzite and quartz sand.

"Fine grain" means as fine as sand, particle size, for example, 0.5 to 5 mm, preferably about 1 mm.

"Excess" means that the carbon unused in the raw-material moldings for the reduction of the silicon dioxide to silicon carbide is quantitatively sufficient to stoichiometrically produce the SiC and leave enough carbon to form the coke structure agglomerates.

Considered summarily, the reduction takes place in two stages as follows:

$$SiO_2 + 3C = SiC + 2CO,$$ 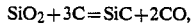

$$SiO_2 + 2SiC = 3Si + 2CO.$$ 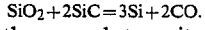

In the second stage, it progresses to form silicon monoxide:

$$SiO_2 + C = SiO + CO.$$ 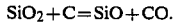

The silicon monoxide, which is gaseous at the temperature concerned, reaches the top of the low-shaft electric furnace.

In earlier methods of the kind concerned (see the above-mentioned application and German Patent document DE-OS No. 34 11 371) the raw-material moldings are made by briquetting.

Briquettable carbon is used in a quantity sufficient for briquetting, preferably by hot briquetting, although cold briquetting is also used, with the addition of bituminous binders.

The raw-material moldings also contain the carbon in the form of carbon carriers, which are inert in respect of briquetting, e.g. petroleum coke, anthracite, graphite, lignite coke, coal coke and the like.

Silicon dioxide can, of course, be made into ferrosilicon and silicon metal by introducing suitable substances into the low-shaft electric furnace, e.g. iron in the form of iron shavings or iron granulate or iron oxide. These known steps have proved satisfactory. They give a considerably increased silicon yield with a low power consumption to the low-shaft electric furnace and a reduced electrode consumption for the same.

This is due, we have found, to the fact that coke structure agglomerates are formed from the raw-material moldings in the first reduction stage to silicon carbide, and they have a much larger surface, i.e. coke structure surface, as compared with the carbon in a silicon dioxide and carbon charge.

Their specific internal area is usually less than 5 m²/g. The enlarged surface makes the coke structure agglomerates particularly reactive and to some extent activates them in respect of the carbon reactivity. However, still some gaseous silicon monoxide is liberated, and this has an adverse effect on the silicon yield and also the current consumption.

OBJECT OF THE INVENTION

The object of the invention is to improve the process according to the invention, in respect of current consumption and silicon yield and so to arrange it, that a very pure metallic silicon can be obtained.

SUMMARY OF THE INVENTION

To this end, according to the invention, the raw-material moldings are formed with a bituminous binder, to which fine-particle silica powder has been added having a specific internal area of at least 5 m²/g, in a quantity such that coke structure agglomerates having a specific internal carbon area of more than 5 m²/g in all, preferably above 10 m²/g, are formed on reduction of the silicon carbide in the raw-material moldings.

Further reduction with the coke structure agglomerates having the internal area of above 5 m²/g is carried out in the bottom part of the low-shaft electric furnace.

Additional internal area is produced in the coke structure agglomerates by the fine-particle silica powder, which is initially reduced to silicon carbide in the electric low shaft furnace, and this additional active furnace area to some extent adsorbs the gaseous silicon monoxide and reduces it as the process progresses.

Of course, the fine-grain silicon dioxide also contributes to forming the active internal area of the coke structure.

The term "bituminous binder" refers to all suitable bitumens, more particularly, those which are conventionally used as binders, for example, in roadbuilding and briquetting. The melting point should be above 60° C. as far as possible.

Of course, the individual particles of the fine-particle silica powder should be wetted as intimately as possible and mixed as homogeneously as possible with the bituminous binder. This is possible without difficulty by making the bituminous binder sufficiently liquid by heating the same and then carrying out the mixture with the silica powder, e.g. using jet mixing principles.

The term "silica powder" denotes very fine-particle silica powder (highly dispersed amorphous silicon dioxide, see the Degussa manufacturer's data on Aerosil), but it also refers to other very fine silicon dioxide powder.

In other words, according to the invention, a reactive carbon surface is additionally induced in the coke structure agglomerates by the addition of silica powder to the raw-material moldings, this being possible by adding the silica powder to the bituminous binder.

The induced inner surfaces form in the unused carbon on the reduction of the silica powder to silicon carbide in the first reduction stage. The induced inner area can be predetermined by the amount of silica powder and its specific inner area.

After coking of the bituminous binder, the silica powder is coated with a layer of coke, which undergoes an appreciable formation of silicon carbide at temperatures from 1500° C. The active surface of the powder is as it were transferred into an active surface of the coke.

The silicon carbide is consumed with further surface development, particularly at the outer boundary surfaces of the small silicon carbide crystals.

It is possible to very accurately control the area increase by the choice of silica powder and its percentage proportion in the binder.

Generally, the raw-material moldings are formed with 4 to 20% by weight of bituminous binder based on the total weight of the raw-material moldings, to which binder 2 or 20% by weight of silica powder has been added based on the bituminous binder.

According to a preferred embodiment of the invention, a silica powder is used in the bituminous binder which has a specific inner area of 200 to 800 m²/g. This gives a useful check. The product of the percentage by weight and the internal area is advantageously kept constant at all relative proportions in the mixture. This means, for example, that 30% by weight with an internal area of 10 m²/g gives the same effect as 0.7% by weight of silica powder having an internal area of about 450 m²/g.

The raw-material moldings are advantageously subjected to a heat treatment at a temperature below the reduction temperature of silicon dioxide to silicon carbide, during which pretreatment the bituminous binder cracks.

The heat pretreatment can be carried out in an upper part of the low-shaft electric furnace where it is possible, for example, to maintain a temperature of about 500° C. Alternatively the heat pretreatment can be carried out as a pre-coking in accordance with a conventional coking process outside the low-shaft electric furnace.

In principle, any process is possible for the production of the raw-material moldings, according to the invention. However, the bituminous binder must be selected so as to ensure that the moldings have sufficient strength not to cake together on transport and to retain their form in a low-shaft electric furnace.

A preferred embodiment of the invention provides a coke structure agglomerate having a specific internal area of 50 to 100 m²/g in the raw-material moldings as a result of the amount of silica powder, the silica powder used preferably having an area of 200 to 800 m²/g.

According to the invention, the raw-material moldings can be introduced as a charge into the low-shaft electric furnace in mixture with the silicon dioxide in lump form and additional carbon. If silicon metal or ferrosilicon are to be produced directly in the low-shaft electric furnace, fine-particle iron can also be added to the charge, e.g. in the form of iron shavings or iron powder, or alternatively, iron oxide.

It is also possible to use raw-material moldings, which additionally contain fine-particle iron.

The raw-material moldings always contain an excess of carbon in respect of reduction of silicon dioxide in the raw-material moldings to silicon carbide.

Advantageously, the raw-material moldings are so constructed as to have an excess of carbon of more than 50% by weight and less than 90% by weight in respect of this reduction of silicon dioxide to silicon carbide.

If the teaching of the invention is applied, and if use is made of extremely fine raw materials, more particularly, an extremely fine bituminous binder, in the form of a double-distilled petroleum product, a silicon of very high purity is obtained.

BRIEF DESCRIPTION OF THE DRAWING

The above and other objects, features and advantages of the present invention will become more readily apparent from the following description, reference being made to the accompanying drawing the sole FIGURE of which is a diagrammatic vertical section through a low-shaft electrical furnace for the purposes of carrying out the process of the present invention.

SPECIFIC DESCRIPTION

In the drawing, we have shown a low-shaft electrical furnace 10 which has an upper portion 11 and a lower portion 12 located above the hearth 13 from which the molten silicon can be tapped through a tapping hole 14.

The burden or charge is introduced at 15 and can consist of silicon dioxide containing reductant briquettes 16 which are formed by hot briquetting, as previously described, with a minimum of 50% excess of carbon above the stoichiometric quantity required for the conversion of all of the $SiO_2$ of these briquettes into silicon carbide.

The temperature at the upper portion 11 of the furnace is above the coking temperature of the carbon excess and is also above the temperature required for activation of the reduction of the silicon dioxide of the briquettes to silicon carbide in accordance with the equations presented earlier. The coking gases and the carbon monoxide, which are formed, are discharged at 17.

A pair of electrodes 18 extend into the furnace to provide the heat required for melting the quartz, which is introduced together with the briquettes as part of the burden so that at the lower portion 12 or high temperature bosh of the furnace, the silicon carbide from the fully reacted briquettes and the excess activated carbon thereof can pass into the molten quartz and effect a further reduction. The molten silicon collects at 13, as previously noted, and can be tapped from the furnace.

At the very top of the furnace, the briquettes can be heat treated to crack the bituminous binder containing the fine-grain silicon.

SPECIFIC EXAMPLES

The production of raw-material moldings by means of a bituminous binder to which fine-particle silica powder has been added can be carried out by any relevant processes. Cold briquetting is used in the following exemplified document.

A binder originating from petroleum and having a softening point of 87° C. was heated to 170° C. and kept in motion with vigorous agitation. The agitator was so designed that a silica powder of high surface area (specific area 800 m²/g) was sucked through a conduit into the hollow shaft of the agitator. The silica powder was radially distributed beneath the surface of the liquid binder and immediately bound in by the vigorous movement. A constant circulation in the agitator vessel ensured that the desired concentration of 10% silica powder was homogeneously distributed. Binder foaming was kept in acceptable limits by a large agitator vessel area. The mix viscosity rose as a result of the addition of the silica powder. Flowability was maintained. The mixture was pumpable, this being important for further processing. Preheated sand and petroleum coke were added to the liquid mixture. This mixture assumed the temperature of 110° C. Kneading was carried out in a steam atmosphere. The final mixture contained 10% of the bituminous binder provided with the silica powder, 40% sand and 50% petroleum coke. The silica powder was represented by 1% of the total mix.

Briquetting of this mixture was carried out at 104° C. in a roller press. In this way, raw-material moldings were produced in the form of briquettes having a volume of 18 cm³. After cooling to ambient temperature, these moldings had, on average, a point compressive strength of 185 kg, which was adequate for all mechanical requirements in respect of storage and transport. Screening tests showed that relatively long transportation distances by road and ship never caused the screenings to rise above 2%.

It is also important for the process, according to the invention, that the raw-material moldings should have the requisite fire stability. This term refers to the behavior of fuels and reactants when the same are heated or shock-heated. This is a daily occurrence and occurs in the low-shaft electric furnace on each charging, since the fresh cold material is always added to a hot charge surface in which the solids have temperatures of above 500° C. and, above which the gases are burning with a considerable heat development. The raw-material moldings satisfied every expectation in this respect too.

In a test, a wire basket was suspended so as to be lowerable into the low-shaft furnace, the raw-material moldings slid beneath the surface of the charge after charging. They were left there for one hour. Then they were withdrawn from the furnace by means of the wire basket and rapidly introduced into an air-tight vessel. Coke structure agglomerates had formed. The point compressive strength of these agglomerates was measured after cooling. It was found that the point compressive strength had increased to 210 kg. The volatile constituents had dropped to below 2%. Some of the moldings were reheated in the laboratory. The weight losses, up to 1600° C., were measured, strength was tested and the internal area determined. All of the values were satisfactory. The specific internal area was 14.3 m²/g. Parallel tests without the addition of silica powder showed a specific area of only 14.2 m²/g.

Silicon was produced by the process described hereinbefore using the raw-material moldings prepared as described, in a low-shaft electric furnace. The result was decisive. The silicon yield was 96.6% with a current consumption of 10600 kwh/tSi. Parallel tests with raw-material moldings without the addition of silica powder gave a silicon yield of only about 80% with an energy consumption of 12800 kwh/tSi. Otherwise, the method of Ser. No. 674,760 was used.

We claim:

1. A process for producing silicon which comprises the steps of:
    (a) molding bodies of quartz sand, an amorphous fine-grain silica powder having a specific internal surface area of at least 5 m²/g, a carbon carrier and a bituminous binder in an amount such that the carbon of said bodies is in excess of that required to reduce the silicon dioxide of the bodies to silicon carbide and such that upon reduction of the silicon dioxide of said bodies to silicon carbide said bodies have a coke structure agglomerate with a specific internal carbon surface area of more than 5 m²/g, said bodies being formed with 4 to 20% by weight of said bituminous binder and silica powder in an amount of 2 to 20% by weight of said bituminous binder;
    (b) forming a melt of silicon dioxide at a bottom part of a low-shaft electrical furnace at least in part by melting silicon dioxide in lump form;
    (c) introducing into an upper portion of said low-shaft electrical furnace a charge to supply said melt, said charge consisting primarily of said bodies and silicon dioxide in lump form;
    (d) reducing the silcon dioxide in said bodies to silicon carbide at a temperature of less than 1600° C. in said upper portion of said low-shaft electrical furnace while heating said silicon dioxide in lump form of said charge so that the heated silicon dioxide in lump form passes into said melt and a coke structure agglomerate with a specific internal carbon surface area of more than 5 m²/g is formed in said bodies, said bodies thereafter passing into said melt;
    (e) reacting said bodies with said melt at a temperature in excess of 1600° C. so that said carbon of said coke structure agglomerate reduces silicon dioxide of said melt to form silicon; and
    (f) tapping said silicon from said furnace.

2. The process defined in claim 1 wherein iron is added to said melt so that ferrosilicon is produced.

3. The process defined in claim 1 wherein said bodies are briquettes and the temperature in step (e) is 1800° C. to 2000° C.

4. The process defined in claim 3 wherein the specific internal carbon surface area of said coke structure agglomerate following step (d) is more than 10 m²/g.

5. The process defined in claim 3 wherein said fine-grain silica powder has a specific internal surface are of 200 to 800 m²/g.

6. The process defined in claim 3, further comprising the step of subjecting said bodies prior to step (d) to a heat pretreatment at a temperature below that of step (d) to cause cracking of said binder.

7. The process defined in claim 6 wherein said heat pretreatment is carried out in an upper part of said low-shaft electrical furnace.

8. The process defined in claim 6 wherein said heat pretreatment is carried out as a precoking outside of said low-shaft electrical furnace.

9. The process defined in claim 3 wherein said specific internal carbon surface area of said coke structure agglomerate following step (d) is between 50 and 100 m²/g.

10. The process defined in claim 3 wherein said charge in step (c) contains additional carbon.

11. The process defined in claim 3 wherein said charge in step (c) contains iron for the production of ferrosilicon.

12. The process defined in claim 11 wherein said iron is provided at least in part in said bodies.

* * * * *